Patented Jan. 7, 1947

2,414,065

UNITED STATES PATENT OFFICE 2,414,065

RUBBER HYDROCHLORIDE COMPOSITIONS

Winfield Scott, Akron, Ohio, assignor to Wingfoot Corporation, Wilmington, Del., a corporation of Delaware No Drawing. Application August 8, 1942, Serial No. 454,123

2 Claims. (Cl. 260—735)

This invention relates to the stabilization of rubber hydrohalides against deterioration by the action of light, either direct or diffused. More particularly, it is directed to the use of nonvolatile, basic, photochemical inhibitors which may be used in rubber hydrochloride compositions and which improve the stability of the rubber hydrochloride regardless of whether the rubber hydrochloride contains an elasticizing material or is unelasticized.

It is known to those familiar with the art that rubber hydrohalides under certain conditions, especially upon exposure to sunlight, deteriorate relatively rapidly, and their useful life is but a fraction of what it would be under different conditions of exposure. The purpose of the present invention is to provide a new class of stabilizers which are useful in both prevention of deterioration and in the plasticization or elasticization of rubber hydrohalide films.

The stabilizers of this invention have extremely low vapor pressures so that they can be classed as nonvolatile. They, therefore, remain in the rubber hydrochloride film and protect it for a longer time than other stabilizers which are more voltaile.

The elasticizers or plasticizers which have previously been used for increasing the tear strength and to give a softer feel to rubber hydrochloride films have usually been esters of higher fatty acids, such as butyl stearate, etc. The stabilizers of this invention are compatible with such elasticizers and themselves have a definite elasticizing action which permits the use of less of the usual elasticizer or its omission altogether in order to give a film which is elasticized to the extent desired. A few per cent of one of the stabilizers of this invention, as for example 2 to 8 per cent, will give a marked improvement in the stability of the film. Up to 15 per cent of an amide of this invention may be used to stabilize the film and to elasticize it.

The stabilizers or photochemical inhibitors of the present invention are amides formed by the reaction of a carboxylic acid with a polyalkylene polyamine with the elimination of water. Usually, one mol of acid will be reacted with one mol of the amine to form the inhibitor of deterioration, but more than one mol of acid may be used in the reaction. The following equation illustrates the formation of the amides of this invention:

RHN(CH₂—CH₂NR₁)ₙCH₂—CH₂NHR+R₂COOH ⟶
RHN(CH₂—CH₂NR₁)ₙCH₂—CH₂NR—OC—R₂+H₂O

In the foregoing formulae, R is hydrogen, alkyl, alicyclic or aralkyl. It may also be a heterocyclic alicyclic substituent as in morpholine derivatives, or other equivalent neutral groups. $R_1$ is any of the same substituents as R though it is not necessarily the same as R in the same molecule. $R_2$ represents a straight or branched aliphatic radical as found in the fatty acids. This radical may contain substituents such as hydroxyl as would be the case in ricinoleic acid. $R_2$ may be unsaturated as in oleic acid. It can be readily seen that the number of acids that may be used is considerable without departing from the spirit of the invention. The following examples illustrate the preparation of such amides:

Example 1

Fifty-seven and four tenths parts of stearic acid and 37.8 parts of tetraethylene pentamine were mixed and heated together in a suitable reactor equipped with a condenser and thermometer. At a temperature of 150° C. reaction is obvious. The temperature is raised to about 200° C. and maintained until no more water is obtained as a distillate. This requires about two hours. A quantitative yield of a waxy solid is obtained. It is believed to have the following formula:

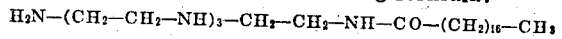

H₂N—(CH₂—CH₂—NH)₃—CH₂—CH₂—NH—CO—(CH₂)₁₆—CH₃

Example 2

The amide formed form equal molar proportions of abietic acid and tetraethylene pentamine was prepared by heating together methyl abietate and tetraethylene pentamine with the removal of methanol. Sixty-three and three tenths grams of methyl abietate and 37.8 of tetraethylene pentamine were heated for four hours at 200—215° C. or until no more methanol was given off or no further loss in weight of the reaction mixture was observed. The final product was a soft, amber-colored resin.

Example 3

Capric acid and tetraethylene pentamine readily react to form an amide by heating together the two materials. Fifty-one and six tenths parts of capric acid and 56.7 parts of tetraethylene pentamine were heated together at 180–200° for one and a half hours, when 5.1 g. of water was condensed. The product is a viscous liquid that deposits some crystals on standing. A quantitative yield was obtained.

Example 4

Two molar proportions of capric acid react with tetraethylene pentamine to give a diamide of the

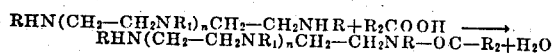

base. This material was prepared by heating together, as in the examples above, 103.2 parts of capric acid and 56.7 parts of tetraethylene pentamine. At 200° C. the calculated amount of water was formed, and the yield of diamide was theoretical. The product is a yellowish, crystalline mush.

Example 5

The amide from lauric acid and triethylene tetramine was prepared by heating these two materials together with the removal of water. Heating was continued for one and a half hours at 190–198° C. The product was made from 50.0 g. of lauric acid and 36.5 g. of triethylene tetramine and was obtained as a light-colored, low-melting solid in quantitative yield.

Example 6

Myristic acid, 68.4 g. was heated with triethylene tetramine, 43.8 g. for two hours at 180–197° C. During the reaction 5.2 g. of water was obtained as a distillate in a heating time of two hours. The amide is a light, waxy solid.

Other acids may be used than those shown in the foregoing examples; among such would be isobutyric, hexoic, beta-ethyl hexoic, pelargonic, undecylenic; palmitic, oleic, hydroabietic, lactic, butoxy acetic and phenoxy acetic acids.

Although ethylene amines have been disclosed specifically, it is possible to use propylene amines or mixed ethylene and proplene amines, etc. Such amines may be made from a mixture of alkylene halides and a mixture of ammonia and primary aliphatic amines. It is not necessary that all amine groups be unsubstituted as in the case, for example, of tetraethylene pentamine. Some must be unsubstituted for reaction with acids to form amides.

As illustrative of this invention, there was prepared a benzene cement, containing rubber hydrochloride and butyl stearate in an amount equal to 5 per cent of the weight of the rubber hydrochloride to which the amides prepared according to the above examples were added in an amount equal to 5 per cent of the weight of the rubber hydrochloride. Films cast from this cement all had materially longer life than the similarly prepared film which contained no stabilizer.

What I claim is:

1. A rubber hydrochloride film which contains as a stabilizer an amide of a monocarboxylic aliphatic acid with a polyalkylene polyamine.

2. A rubber hydrochloride film which contains as a stabilizer an amide of a monocarboxylic aliphatic acid with a polyethylene polyamine.

WINFIELD SCOTT.